Patented Apr. 23, 1940

2,197,784

UNITED STATES PATENT OFFICE 2,197,784

PREPARATION OF BAKERY MATERIALS

Hans F. Bauer, Chicago, and Bruce W. Thayer, Evanston, Ill., assignors to Stein, Hall Manufacturing Company, Chicago, Ill., a corporation of Delaware No Drawing. Application June 14, 1937, Serial No. 148,066

5 Claims. (Cl. 99—94)

This invention relates to bakery materials including compositions or materials employed in baking and the finished bakery products. The bakery products contemplated in accordance with the invention may be either of an enzyme leavened or chemically aerated nature, such as breads, cakes, biscuits and other like substances. The invention particularly relates to new and improved compositions of matter adapted for use in baking and which when used in baking have the effect of modifying the gluten present in the flour to render it mellow and more tensile without dispersing it and at the same time providing uniform, sustained gassing power to produce bakery products which are much softer and less subject to staling than similar products prepared by the usual methods. Such products also have a better color than bakery products prepared by the usual methods.

One of the disadvantages that has been found to be inherent in the characteristics of gluten-containing flours ordinarily employed in making bread and other bakery products is the relative toughness or lack of tensibility of the dough formed from such flours. The gluten in the flour may well be considered the backbone of the finished bakery product because its characteristics largely determine the results obtained in baking. If the nature of the flour is such that a tough and relatively non-tensible dough is produced, the formation or expansion of gas within the dough or batter generated by a leavening agent such as yeast or a chemically aerating agent such as baking powder will be restrained, with a resultant production of bread or other bakery products which leave much to be desired. This toughness of the dough attributable to the condition of the gluten in the flour, also tends to allow an uneven expansion of the gases, resulting in uneven porosity of the product.

In using certain agents for increasing the porosity of the dough, for example, yeast, there may be brought into operation after a period of time a mellowing action upon the gluten, but this condition only arises after a considerable period of time has elapsed and then only by a careful control of the operating conditions and proper working of the dough. One of the inventors herein has discovered that by the use of gel-inhibiting agents in proper amounts, as described and claimed in U. S. application Serial No. 685,637, filed August 17, 1933, which matured into U. S. Patent No. 2,113,570 on April 12, 1938, it is possible to modify the gluten content of a flour a sufficient amount to soften or mellow the same without dispersing the gluten. As a result of this discovery, modified cereal flours have been prepared which, when mixed with untreated flours in proper proportions, have a desirable softening or mellowing effect upon the untreated flours, increasing the tensibility of the dough and improving the resultant bakery product. These modified flours which are herein referred to as "Protamyline" products are especially suitable for use with untreated hard flours. When used with untreated soft flours, they have some advantages in mellowing the gluten content and in improving the products, but care must be taken that the dough is not made too soft.

The trade name "Protamyline" is used herein to describe a dry, converted, non-gelatinized product from flour comprising converted flour, starch and acid modified, non-starchy components, said product having therein substantially all of the natural elements of the flour and being obtainable by converting a flour having starchy and non-starchy components in a relatively dry state in the presence of a non-starchy component gel-inhibiting agent and a starch conversion agent. As hereinafter pointed out, for the purpose of the present invention the gluten-conditioned wheat base or "Protamyline" should be so converted that the gluten content is acted upon sufficiently to increase its extensibility but insufficiently to destroy its elasticity, or, in other words, insufficiently to render it entirely inert. Technically, the "Protamyline" product which we employ herein may also be described as a cereal flour which has been partially dextrinized by dry conversion and which has its gluten content mellowed but not dispersed or rendered inert by a non-starchy component gel-inhibiting agent.

Numerous other problems occur in making bakery products. For instance, in making a dough or batter, it is desirable that the sequence of operations be continuous because in case of a breakdown of machinery at certain points in the dough-making, chemical deterioration of the dough may occur. This deterioration may result in compounds being formed which have an unpleasant taste or it may completely spoil the dough and render it useless. This is particularly true in case of the loss of fermentation products resulting in making a leavened dough with yeast.

One of the other difficulties encountered is lack of steady, uniform, sustained gassing power. Thus, the gassing power may be too rapid or it may become exhausted too rapidly. Perhaps one of the most important of the desiderata in making bakery products is the preparation of a product which remains soft and does not tend to become stale over a long period of time.

With the foregoing considerations in mind, it is an object of the present invention to produce a flour conditioner or improver which not only has a mellowing effect without dispersing the gluten of the flour but provides sustained gassing power.

A further object is to produce a new and improved composition of matter which acts as a flour conditioner in making bakery products and substantially retards or inhibits spoiling of the dough in case of a breakdown or other mechanical difficulty during the dough-making process.

An additional object is to provide a new and improved composition of matter which, when used in the preparation of bakery products, produces products which have a soft feel and retards or inhibits staling to the extent that such products will remain soft two or three times as long as similar products produced by ordinary methods.

Another object is to produce a new and improved conditioner for flours containing gluten which may be added to soft flours over a relatively wide range of proportions without rendering the flour too soft for practical purposes.

Other objects are the preparation of improved bakery products, the provision of new and improved methods for producing bakery products, the production of new and improved flour conditioners, bread improvers, and gluten-containing flour compositions including doughs and batters. Other objects and advantages will appear as the description proceeds.

In accordance with the invention, it has been found that a flour composition containing an intimate mixture of a gluten conditioner adapted to mellow the gluten without dispersing it, a soluble dextrin which is acted upon by the enzymes present in malted cereals, and a malted cereal flour, said composition preferably also containing an untreated flour, is eminently suitable for addition to untreated flours in making bakery products.

Doughs and batters prepared by mixing the aforesaid flour conditioners with the usual types of flours in which the gluten content has been substantially unmodified, together with the other ingredients ordinarily employed in baking, possess excellent mellow and tensile characteristics and at the same time have uniform, steady, sustained gassing power, with the result that bakery products produced therefrom have an excellent texture, do not tend to cave in and have an excellent color. Furthermore, we have found that a flour or dough conditioner of the type herein described substantially retards or inhibits spoiling of the dough in case of a breakdown of mechanical equipment during the dough-making operation and produces a final baked product which remains soft two or three times as long as similar products made by ordinary methods.

Another important feature of our flour conditioner lies in the fact that it may be added to relatively soft flours over a relatively wide range of proportions, for example, 1% to 10%, without the necessity of taking precautions against rendering the flour too soft. The flour conditioner of our invention is especially suitable for use with hard flours.

A preferred embodiment of the present invention may be illustrated by the following composition prepared by blending or mixing together the various ingredients in any suitable manner adapted to obtain a uniform blend:

| | Percent |
|---|---|
| Wheat malt | 8 |
| Gluten-conditioned wheat base (herein referred to as "Protamyline") | 20 |
| White corn dextrin (about 60% soluble or dispersible in water at ordinary temperatures) | 62 |
| Untreated wheat flour | 10 |

The wheat malt in this composition is preferably a malted wheat flour prepared by soaking the whole grain in water and sprouting under perfect conditions in what is known as a pneumatic malting system, the conditions used being such that the diastatic and other enzymes formed are not destroyed. To attain this end it is desirable that the temperatures employed be not higher than about 170° F. Other cereals may be similarly treated and substituted in the composition in whole or in part for the malted wheat flour.

The gluten-conditioned wheat base in the foregoing composition may be prepared by blending together a gluten-modifying agent and a wheat flour and heating the blend to modify the gluten, then acidifying and heating the resultant acidified product to a higher temperature until the product develops a soluble dextrin content of about 6% to 10%, as described in U. S. Patent No. 2,113,570, granted April 12, 1938, to one of the inventors herein. The final product is substantially free from the gluten-modifying (gel-inhibiting) agent. Other gluten-conditioned cereals may be similarly prepared and substituted in whole or in part.

The highly soluble white corn dextrin employed in making the above product may be prepared by dextrinizing cornstarch according to well-known methods in a manner adapted to produce a product of the desired solubility. Other dextrins may be substituted in whole or in part for corn dextrin.

Another example of a bakery material prepared in accordance with this invention is one having the following composition:

| | Percent |
|---|---|
| White corn dextrin (55% to 65% soluble or dispersible in water at ordinary temperatures) | 70 |
| Malted wheat flour | 10 |
| Gluten-conditioned wheat base ("Protamyline") | 10 |
| Ordinary wheat flour | 10 |

The ingredients in this case are blended in the same manner as before and each may be prepared in the same way. As in the previous example, the addition of the untreated flour is optional.

Either one of the compositions described above is preferably employed in making bakery products by mixing or blending the composition with the ordinary or untreated flour employed in baking in proportions of about 1% to 10% of flour-conditioning composition to 90% to 99% ordinary flour. We preferably employ about 5 pounds of our flour-conditioning composition per 100 pounds of flour. The exact proportions employed will naturally depend somewhat on the type of ordinary flour used, for instance, the requirements for a hard flour will ordinarily differ from those of a soft flour. We have found, however, that our flour conditioner has a relatively wide range of tolerance and even though we employ as much as 10% of our flour-conditioning composition with a relatively soft flour, no harmful effects, such as too much softening of the dough, are obtained. This is quite important from a baker's standpoint, because it means that he need not be unduly careful or exacting in determining the nature of his flour and in measuring the proportions of the flour conditioner to be employed therewith.

While our preferred compositions are those of the foregoing type, it will be understood that we may make variations in the nature and proportions of the ingredients without departing from the invention. Thus, as indicated previously, instead of malted wheat flour, we may use other malted cereal flours. By the term "cereals" we mean to include all grains and other vegetable substances containing starch and gluten and protein, such as corn, wheat, barley, rye, rice and similar substances, in either milled or unmilled form, cereal flours being ground cereals. Thus, we may use malted corn flour, malted rice flour, malted barley flour and the like.

The preparation of the "Protamyline" products used in the present invention is based upon the discovery of the gel-inhibiting or liquefying properties of certain compounds as described and claimed in United States Patents Nos. 1,938,574 and 1,969,347, granted to one of the inventors herein.

The dextrin employed in making our bakery materials may be a commercial dextrin. The term "commercial dextrin" does not necessarily mean chemically pure dextrin but is a term generally used to designate the mixture of starch isomerides and reducing sugars along with other substances obtained by breaking or partially breaking down, hydrolyzing or converting starch or cereal of high starch content by means of heat, acids, acid salts, enzymes, combinations of these means, or other catalysts. The usual type of commercial dextrin as herein employed is made by roasting a starch-containing material, such as corn, potato, tapioca, and the like, in the presence of an acid dextrinization catalyst. For the purpose of this invention, a dextrin which is about 55% to about 65% soluble or dispersible in water at ordinary temperatures and pressures is especially suitable because such a dextrin is readily acted upon by the enzymes present in malted flours, such as malted wheat flour, malted barley flour and the like, in the presence of moisture at ordinary as well as elevated temperatures, to form maltose and other sugars, whereas these enzymes do not ordinarily act upon starch at ordinary temperatures.

The nature of the reaction is not definitely known but it is believed that the proportions of the various ingredients are such that the amount of dextrin is sufficient that when acted on by the enzymes present in the malted cereal, during the dough stage and in the subsequent first stage of heating during the baking process maltose and other sugars are steadily and continuously formed, which in turn feed the yeast and thereby produce uniform, steady and sustained gassing power. The amount of malted cereal employed is preferably in excess of that required to convert the dextrin to maltose during the dough making and baking operations, the excess being sufficient to perform the usual functions of malt in making bakery products. At the same time the amount of "Protamyline" is sufficient to modify and mellow but not disperse the gluten in the untreated flour employed in making the dough.

It will be understood that in making our flour conditioners we may use various combinations of malted cereals, dextrins and "Protamyline" products. Thus, we may use a malted barley flour in conjunction with a wheat base "Protamyline" and a corn dextrin, or a malted wheat flour in conjunction with a corn base "Protamyline" and a tapioca dextrin. Our composition may be a two component composition consisting of a malted cereal and a partially dextrinized gluten-modified cereal (Protamyline), in which event, however, it is preferable that at least a part of the gluten-modified cereal be more highly dextrinized than heretofore described. Thus, an all-vegetable flour conditioner may be prepared in which all of the ingredients are derived from a cereal, e. g., a composition consisting of malted wheat flour, and a dextrinized or partly dextrinized gluten-modified wheat flour. While the use of an untreated flour in the flour conditioning composition is optional, we are not confined to the use of wheat flour for this purpose but may employ other types of cereal flours, e. g., rye flour and oat flour.

The use of our flour conditioner is not confined to making any particular type of bakery product, although it is especially useful in making leavened baked products and particularly bread.

Our preferred range of proportions may be represented by the following blend:

| | Parts by weight |
|---|---|
| Malted cereal | 5 to 25 |
| Gluten-modified, and at least partly dextrinized, cereal (Protamyline) | 5 to 80 |
| Dextrin | 0 to 80 |
| Untreated cereal | 0 to 40 |

This composition is preferably used with untreated or ordinary bleached or unbleached cereal flours in proportions from 1% to 10% of the untreated flour, as already stated, together with the proportions of water and other ingredients required to make a suitable bakery product. It will be understood that the exact composition of our flour compositions may vary depending upon the nature of the ingredients, and the purpose for which the composition is to be used.

The advantages obtained from the present invention are far beyond expectation. Malt extracts have been used before in relatively small amounts in order to improve the color and quality of bread. Dextrins have also been used in breadmaking and one of the joint inventors herein has disclosed and claimed in United States Patent No. 2,113,570, granted April 12, 1938, the preparation and use of "Protamyline" products for baking. It was not to be expected, therefore, that the particular combination of materials herein described and claimed would produce such improved results in bakery products. Thus, it was by no means obvious that the use of this invention would inhibit the staling of a loaf of bread two to three times as long as compared with bread prepared by ordinary methods.

By an "untreated flour" we intend to cover ordinary bleached or unbleached flours. Our enzyme or enzyme liberating bodies are preferably in solid form containing insufficient moisture to cause any substantial action on the dextrin in the flour-conditioning composition at ordinary temperatures and pressures. Not until water is added to form a batter or dough should the enzymes become sufficiently active to act upon the dextrin. We employ the expression "enzymes of malted cereals" to define the type or types of enzymes, which may include cytase, diastase, peptase and other enzymes present in germinated vegetable substances. By ordinary temperatures we mean temperatures around 60° to 80° F.

As previously indicated, we employ herein the expression "partially dextrinized, gluten-mellowed cereal flour" to cover a partially dextrinized cereal flour dry converted in the presence of a non-starchy component gel-inhibiting agent and a starch conversion agent sufficiently to increase the tensibility of the gluten content but insufficiently to entirely destroy its elasticity.

Having thus described the invention, what we claim as new and desire to secure by Letters Patent of the United States is:

1. As a composition of matter, a flour conditioner suitable for addition to untreated flours in making bakery products and comprising an intimate solid blend of a dextrin, a malted cereal flour containing insufficient moisture to activate the enzymes present therein, and a partially dextrinized cereal flour having its gluten content acted upon by a non-starchy component gel-inhibiting agent sufficiently to increase its tensibility but insufficiently to entirely destroy its elasticity.

2. A flour composition comprising a 90% to 99% untreated flour and 1% to 10% of an intimate mixture of a dextrin, enzymes of malted cereals adapted to convert said dextrin to sugars at ordinary and elevated temperatures in the presence of moisture, and a cereal flour having its gluten content modified by treatment with a non-starchy component gel-inhibiting agent sufficiently to increase the tensibility of the gluten but insufficiently to entirely destroy its elasticity.

3. In the art of baking, the step which comprises incorporating into the flour employed an intimate blend of a dextrin, a malted cereal, and a cereal having its gluten content acted upon by a non-starchy component gel-inhibiting agent sufficiently to increase its tensibility but insufficiently to entirely destroy its elasticity.

4. In the art of making leavened baked products, the step which comprises incorporating into the flour employed an intimate blend of a dextrin approximately 55% to 65% soluble in water at ordinary temperatures and pressures, a malted cereal flour adapted to convert said dextrin to sugars at ordinary and elevated temperatures in the presence of moisture, and a cereal flour having its gluten content acted upon by a non-starchy component gel-inhibiting agent sufficiently to increase its tensibility but insufficiently to entirely destroy its elasticity.

5. A composition of matter for use in preparing bakery products comprising an intimate blend of a dextrine which is of sufficiently high solubility to be acted upon by a malted cereal flour at ordinary as well as elevated temperatures in the presence of moisture to form maltose, a malted cereal flour capable of acting upon said dextrine in the presence of moisture at ordinary as well as elevated temperatures, and a partially dextrinized gluten-modified cereal flour which has been acted upon by a non-starchy component gel-inhibiting agent sufficiently to increase its tensibility but insufficiently to entirely destroy its elasticity, said dextrine being present in substantial amount but not exceeding about 80 parts by weight of the blend, the amount of said malted cereal flour being about 5 to about 25 parts by weight of said blend, and the amount of said gluten-modified cereal flour being about 5 to about 80 parts by weight of said blend.

HANS F. BAUER.
BRUCE W. THAYER.